United States Patent [19]

Wheeler et al.

[11] 4,046,332
[45] Sept. 6, 1977

[54] SUPPORT FOR SAFETY BELT RETRACTOR INERTIA MECHANISM

[75] Inventors: Walter Morris Wheeler, Fraser; Klaus Frederick Ocker, Mount Clemens, both of Mich.

[73] Assignee: Allied Chemical Corporation, Morris Township, N.J.

[21] Appl. No.: 574,230

[22] Filed: May 2, 1975

[51] Int. Cl.$^2$ .................. A62B 35/00; B65H 75/48
[52] U.S. Cl. .................................. 242/107.4 A
[58] Field of Search ............... 242/107.4 A; 297/388; 280/744–747

[56] References Cited

U.S. PATENT DOCUMENTS

| | | | |
|---|---|---|---|
| 3,578,260 | 5/1971 | Kell | 242/107.4 A |
| 3,831,878 | 8/1974 | Griffin | 242/107.4 A |
| 3,838,831 | 10/1974 | Bell | 242/107.4 A |
| 3,885,753 | 5/1975 | Connors | 242/107.4 A |
| 3,923,269 | 12/1975 | Kell | 242/107.4 A |

Primary Examiner—Stanley N. Gilreath
Assistant Examiner—John M. Jillions
Attorney, Agent, or Firm—John P. Kirby, Jr.; Roger H. Criss

[57] ABSTRACT

An improved support means for a safety belt retractor includes: a stationary member, a movable member, and a fastening means. The stationary member is mounted on the retractor. The movable member is mounted on the stationary member. The movable member is adjustable in one plane with reference to the stationary member. An inertia mechanism and an actuating means are mounted on the movable member and are adjustable with the movable member. The fastening means pre-sets the movable member with reference to the stationary so that the movable member supports the inertia mechanism in a desired position when the retractor is tilted for installation in a vehicle. The support means further includes: an adjustment centerline, a pivot axis for the stationary member, and a pivot axis for the movable member. The pivot axis for the stationary member and the pivot axis for the movable member are arranged approximately along the adjustment centerline. The actuating means has a locking end for engagement with ratchet teeth of a ratchet wheel. The locking end has adjustment motion in a circumferential arc. The arc has a center point which lies approximately on the adjustment centerline. The locking end during adjustment remains at approximately the same distance from an engaging edge of the ratchet tooth which is in a ratchet tooth engagement position.

4 Claims, 8 Drawing Figures

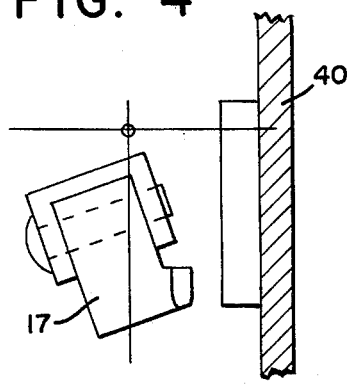
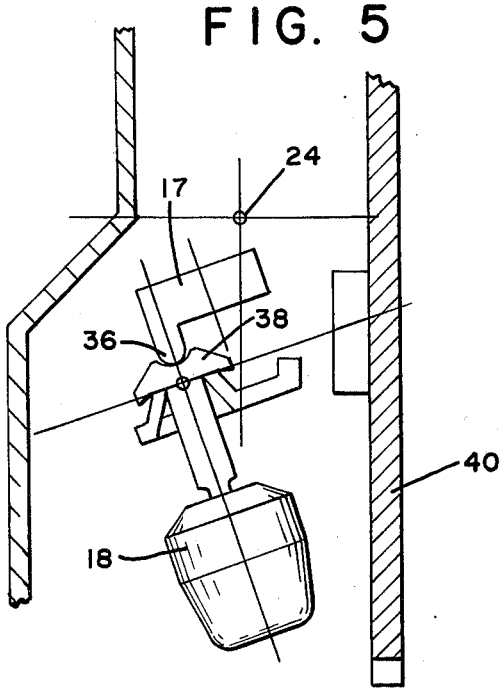
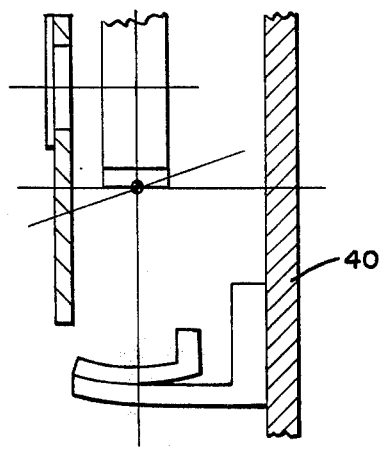
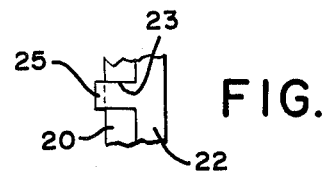
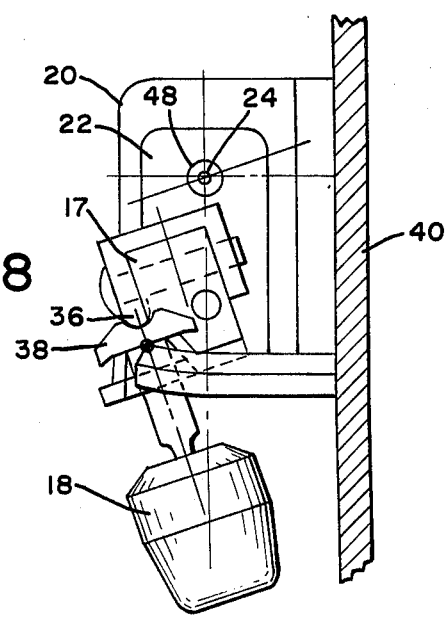

SUPPORT FOR SAFETY BELT RETRACTOR INERTIA MECHANISM

BACKGROUND OF THE INVENTION

The present invention relates to a safety belt for vehicles and more particularly to a safety belt retractor which is vehicle-sensitive. Still more particularly, the present invention relates to an improved support means for a vehicle-sensitive mechanism, such as a pendulum assembly, of a retractor. A vehicle sensitive mechanism responds to motion of the vehicle, as distinguished from motion of the safety belt. The improved support means supports the vehicle sensitive mechanism in a desired position, even under conditions where the retractor must be tilted out of the verticle plane for purposes of installation in the vehicle, such as when the retractor is positioned on the back of a seat in the vehicle.

Prior art apparatus for supporting a vehicle sensitive mechanism are disclosed in the following U.S. Pat. Nos. 3,995,788 entitled "Vehicle Sensitive Retractor with Improved Universal Pendulum and Gimbal" 3,913,861 entitled "Vehicle Sensitive Retractor with Double Pendulum" 3,938,755 entitled "Vehicle Sensitive Retractor with Enclosed Double Pendulum" all filed on July 10, 1974, in the name of R. L. Stephenson, R. Pfeiffer and Y. Loomba. U.S. Pat. No. 3,552,676 to Weber discloses a different apparatus for supporting a pendulum.

SUMMARY OF THE INVENTION

The invention is an improved support means adapted for use in a safety belt retractor. The retractor has a reel for winding a safety belt thereon, means to lock the reel and thereby restrain an occupant of the vehicle during dangerous situations, an inertia mechanism, including a ratchet wheel having ratchet teeth and a ratchet tooth engagement position, a support means mounted on the retractor for supporting the inertia mechanism, and an actuating means responsive to the inertia mechanism for engaging a ratchet tooth in the ratchet tooth engagement position to lock the reel. The ratchet tooth engagement position is a position in which a ratchet tooth is positioned for engagement by the actuating means. The improved support means includes: a stationary member, a movable member and a fastening means. The stationary member is mounted on the retractor. The movable member is mounted on the stationary member. The movable member is adjustable with reference to the stationary member by tilting the movable member in one plane with reference to the stationary member. The inertia mechanism and the actuating means are mounted on the movable member and are adjustable with the movable member with reference to the stationary member. The fastening means is on the stationary member and on the movable member to pre-set the movable member with reference to the stationary member after adjustment of the movable member with reference to the stationary member, so that the movable member supports the inertia mechanism in a desired position when the retractor is tilted for installation in a vehicle. The safety belt retractor further includes: an adjustment centerline, a pivot axis for the stationary member, and a pivot axis for the adjustment member. The pivot axis for the stationary member and the pivot axis for movable member are arranged approximately along the adjustment centerline. Each ratchet tooth has an engaging edge. When a ratchet tooth is in the ratchet tooth engagement position, the engaging edge lies approximately on the adjustment centerline.

The stationary member pivot axis and the movable member pivot axis are aligned with one another and cooperate with one another to allow the movable member to pivot and tilt with reference to the stationary member. The ratchet wheel is disposed in a ratchet wheel plane. The movable member has motion for adjustment with reference to the stationary member in an adjustment plane approximately perpendicular to the ratchet wheel plane. The movable member has adjustment motion in an adjustment plane approximately perpendicular to the ratchet wheel plane.

The actuating means has a locking end for engagement with the ratchet teeth of the ratchet wheel. The locking end is disposed adjacent to the ratchet teeth of the ratchet wheel prior to engagement thereof. The locking end is adjustable with reference to the stationary member by virtue of the actuating means being mounted on the movable member. The locking end has adjustment motion in a circumferential arc. The arc has a center point which lies on the adjustment centerline. The center point is aligned with the pivot axis for the movable member and the pivot axis for the adjustable member. The locking end during adjustment remains at approximately the same distance from the engaging edge of the ratchet tooth which is in the ratchet tooth engagement position for uniform sensitivity.

DESCRIPTION OF THE DRAWINGS

FIG. 4 is a sectional view of a portion of FIG. 1 along the lines 4—4 in FIG. 1.

FIG. 5 is a sectional view of a portion of FIG. 1 along the lines 5—5 in FIG. 1.

FIG. 6 is a sectional view of a portion of FIG. 1 along the lines 6—6 in FIG. 1.

FIG. 7 is a sectional view of a portion of FIG. 1 along the lines 7—7 in FIG. 1.

FIG. 8 is a side elevational view of a portion of FIG. 1 in the direction of arrow A in FIG. 1.

DETAILED DESCRIPTION

Figure 1:
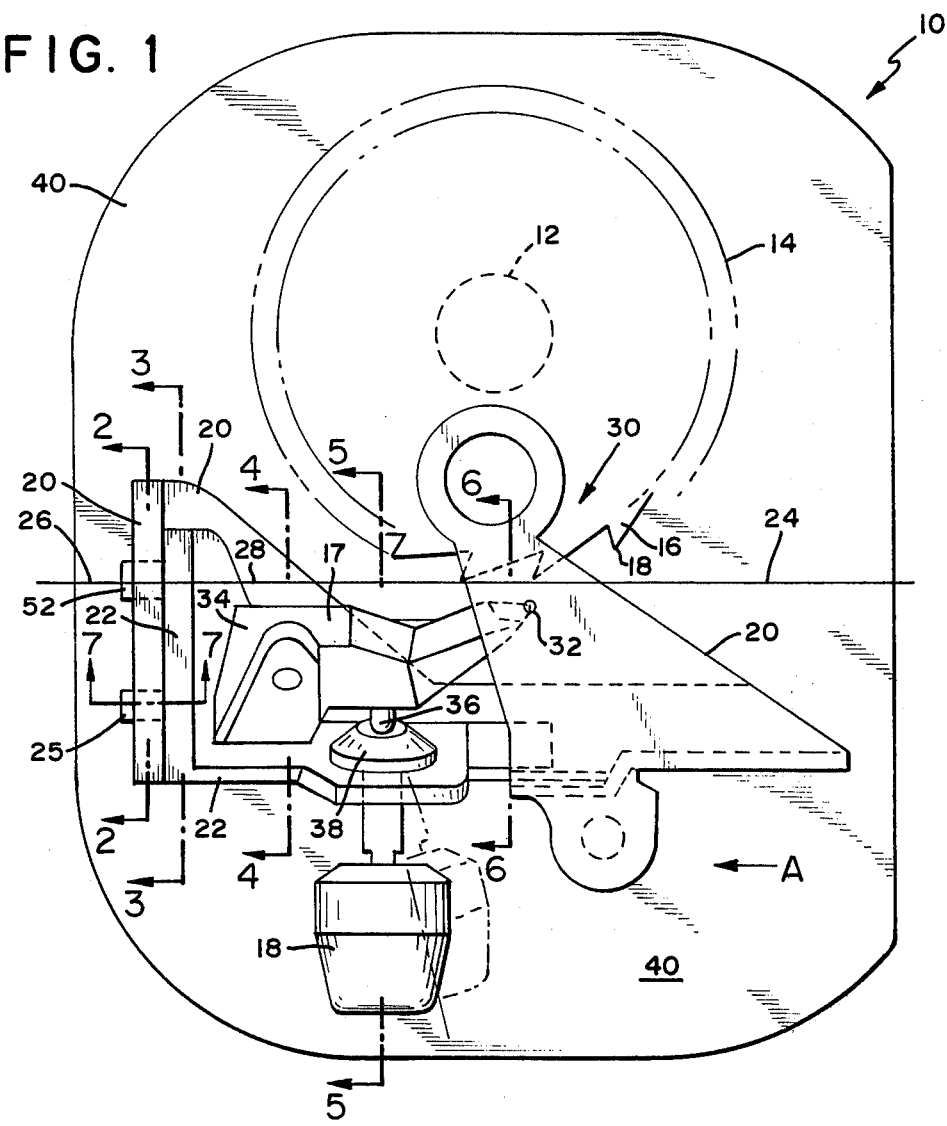
FIG. 1 is a side elevational view of a vehicle-sensitive, inertia-operated, safety belt retractor having the improved variable support of the present invention for the vehicle-sensitive mechanism.

Referring to FIG. 1, the improved support means of the present invention is adapted for use in a vehicle-sensitive, inertia-operated safety belt retractor, indicated generally by the numeral 10, or a safety belt retractor 10 which is both vehicle-sensitive and belt sensitive. A vehicle sensitive retractor responds to certain movements of the vehicle, such as deceleration, acceleration and over-turning. A belt-sensitive retractor responds to certain movements of the safety belt, such as acceleration in unwinding of the safety belt. The retractor 10 has a reel 12 for winding a safety belt thereon and means to lock the reel 12. The means to lock the reel 12 prevents further withdrawal of a safety belt from the retractor 10 and thereby restrains an occupant in the vehicle during dangerous situations.

The means for locking the reel 12 include a ratchet wheel 14 which has ratchet teeth 16 and a ratchet tooth engagement position 30. Each of the ratchet teeth 16 has an engagement edge 18. The retractor 10 also includes an inertia mechanism, a support means mounted on the retractor 10 for supporting the inertia mechanism, and an actuating means 17 responsive to the inertia mechanism for operating the means for locking the reel. The inertia mechanism may be a pendulum 18.

In the improvement of the present invention, the support means includes: a stationary member 20, a movable member 22, a fastening means, an adjustment centerline 24, a pivot axis 26 for the stationary member 20, and/a pivot axis 28 for the movable member 22, The stationary member 20 is mounted on the retractor 2. The movable member 22 is mounted on the stationary member 20. The movable member is adjustable with reference to the stationary member 20 by tilting the movable member 22 in one plane with reference to the stationary member 20. The inertia mechanism, such as the pendulum 18, and the actuating means 17 are both mounted on the movable member 22 and are adjustable therewith.

Figure 2:
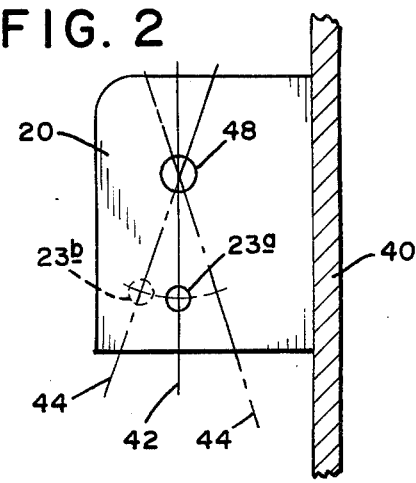
FIG. 2 is a sectional view of a portion of FIG. 1 along the lines 2—2 in FIG. 1.

Referring to FIGS. 1, 2 and 7, the fastening means includes: a hole 23 or indentation on the stationary member 20 and a peg 25, boss or other extension on the movable member 22. The peg 25 fits into the aperture 23 to fasten the movable member 22 and thereby pre-set the movable member 22 in position with reference to the stationary member 20. Such pre-setting occurs after adjustment of the movable member supports the inertia mechanism in a desired position when the retractor 10 is tilted for installation in a vehicle. For example, the movable member 22 may be adjusted and then pre-set to support the pendulum 18 in a substantially vetical plane when the retractor 10 is tilted for installation in a vehicle. The axis 26 for the stationary member 20 is arranged approximately aong the adjustment centerline 24. The pivot axis 28 for the movable member 22 is also arranged approximately along the adjustment centerline 24. The ratchet wheel 14 is positioned adjacent to the actuating means 17 for engagement by the actuating means 17.

The stationary member axis 26 and the movable member pivot axis 28 are aligned with one another and cooperate with one another to allow the movable member 22 to pivot and tilt with reference to the stationary member 20. The ratchet wheel 14 is disposed in a ratchet wheel plane. The movable member 22 has adjustment motion for adjustment with reference to the stationary member 20, in an adjustment plane approximately perpendicular to the ratchet wheel plane.

The actuating means 17, such as a pawl, has a locking end 32 for engagement with a ratchet tooth 16 of the ratchet wheel 14. The locking end 32 is disposed adjacent to the ratchet teeth 16 of the ratchet wheel 14 prior to engagement thereof. The locking end 32 is adjustable with reference to the stationary member by virtue of the actuating means 17 being mounted on and adjustable with the movable member 22. The locking end 32 has adjustment motion in a circumferential arc. The arc has a center point which lies approximately on the adjustment centerline. The center point is approximately aligned with the pivot axis for the movable member and the pivot axis for the adjustable member. The locking end 32 during adjustment remains at approximately the same distance from the engaging edge 18 of the ratchet tooth 16 which is in the ratchet tooth engagement position 30. The arrangement whereby the locking end 32 remains during adjustment at approximately the same distance from the engaging edge 18 of the ratchet tooth 16 provides for uniform sensitivity despite adjustment of the actuating member 17 and the movable member 22.

Referring to FIG. 1, the improved support means of the present invention may be positioned on the outside of a housing 40 for the retractor, as shown in FIG. 1. In the alternative, the support means of the present invention may be positioned inside the retractor housing 40. Where the support means is positioned outside the retractor housing 40, as shown in FIG. 1, the ratchet wheel 14 is also positioned outside the housing 40. If the support means were positioned inside the housing 40, the ratchet wheel 14 would also be positioned inside the housing 40.

The actuating means 17 has a pivot end 34 disposed at the opposite end of the acuating means 17 from the locking end 32. The pivot end 34 is pivotably mounted on the movable member 22. The actuating means 17 has a contact member 36 disposed between the locking end 32 and the pivot end 34, that is, in the approximate middle portion of the actuating means 17. The contact member 36 rests on the pendulum 18. The pendulum 18 has a pendulum head 38 and a depression in the center of the pendulum head 38. The contact member 36 rests in the depression of the pendulum head 38. The actuating means 17 is actuated directly by the inertia member and operates directly on the means for locking the reel. The term "directly" indicates that there is no intermediate structure between the pendulum head 38 and the contact member 36 of the actuating means 17 and there is no intermediate structure between the locking end 32 of the actuating means 17 and the ratchet teeth 16 of the ratchet wheel 14.

Figure 3:
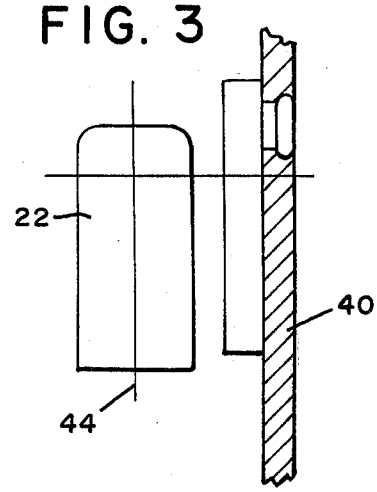
FIG. 3 is a sectional view of a portion of FIG. 1 along the lines 3—3 in FIG. 1.

Referring to FIG. 2, the stationary member 20 has a longitudinal axis 42. Referring to FIGS. 2 and 3, the movable member 22 also has a longitudinal axis 44. The movable member 22 may be positioned with its longitudinal axis 44 in a substantially vertical position, as shown in FIG. 3. In the alternative, the longitudinal axis 44 of the movable member 22 may be positioned at an angle up to approximately 18 degrees with reference to the longitudinal axis 42 of the stationary member 20, as shown in FIG. 2. The longitudinal axis 44 of the movable member 22 may be adjusted 0° to 18° in either the direction from the longitudinal axis 42 for a total of approximately 36 degrees adjustment.

Referring to FIGS. 1, 2 and 7, the stationary member 20 has two holes: an upper hole 48 and a lower hole 23. The movable member 22 has two axles or bosses: an upper axle 52 and a lower peg 25. The lower hole 23 and the lower peg 25 constitute the fastening means. The adjustment of the movable member and pendulum with reference to the stationary member 20 is accomplished during manufacture and fabrication of the retractor. The adjustment is acomplished by virtue of the position in which the lower hole 23 is located in the stationary member 20. Referring to FIG. 2, if the lower hole 23a in the stationary member 20 is located in vertical alignment with the upper hole 48 or slot of the stationary member 20, then the longitudinal axis of the pendulum 18 will be aligned with reference to the housing wall 40 and the longitudinal axis of the retractor 10. If the lower hole 23b of the stationary member 20 is offset from the longitudinal axis 42 of the stationary member, then the longitudinal axis of the pendulum, 18 will be tilted with reference to the housing wall 40 and the longitudinal axis of the retractor.

The upper axle 52 of the movable member 22 extends into the upper hole of 48 of the stationary member 20, allowing the movable member to be adjusted by tilting in one plane with reference to the stationary member 20. The pivot axis 26 for the stationary member 20 extends through the upper hole 48 of the stationary member. The pivot axis for the movable member 22 is formed by the longitudinal axis of the upper axle 52 of the movable member 22.

Referring to FIG. 1 and the cross-sections shown in FIGS. 2, 3, 4 and 6, the stationary member 20 is a substantially L-shaped bracket and the movable member 22 is also a substantially L-shaped bracket fitting within and on top of the stationary member 20. Referring to FIGS. 5 and 8, the pendulum 18 need not be aligned vertically under the adjustment centerline 24 which is shown as a point in FIGS. 5 and 8. The pendulum 18 may be offset vertically from the adjustment centerline 24 and away from the retractor housing 40 in order to allow more space for the pendulum 18 to swing.

We claim:

1. In a safety belt retractor having a reel for winding a safety belt thereon, biasing means for biasing the reel in a belt retraction direction, means to lock the reel and thereby restrain an occupant of a vehicle during dangerous situations, said means to lock the reel including a ratchet wheel disposed in a plane and connected to said reel for rotation therewith, said ratchet wheel having ratchet teeth, each of said ratchet teeth having an engagement edge, said ratchet wheel having a ratchet tooth engagement position in which a ratchet tooth is positioned for engagement, a vehicle sensitive inertia mechanism, a support means mounted on said retractor for supporting the inertia mechanism, and an actuating means responsive to said inertia mechanism for engaging said rathcet tooth in said ratchet tooth engagement position to lock the reel; the improvement wherein said support means comprises:

a first member mounted on said retractor;
a second member mounted on said first member, means for adjustably, pivotally mounted said second member during assembly with reference to said first member by pivoting said second member in one plane with reference to said first member, said inertia mechanism and said actuating means being supported on said second member and pivotally movable therewith; and
a fastening means on said first member and on said second member for pre-setting said second member during assembly with reference to said first member after pivoting movement of said second member with reference to said first member, whereby said second member supports said inertia mechanism in a desired position when the retractor is tilted for installation in a vehicle; and wherein:
said actuating means has a locking end for engagement with said ratchet teeth of said ratchet wheel, said locking end disposed adjacent to said ratchet teeth of said ratchet wheel prior to engagement thereof, said locking end being pivotally movable with respect to said first member, said locking end of said actuating means having motion in a plane approximately perpendicular to said ratchet wheel plane, said locking end having motion in a circumferential arc, said locking end during said pivoting movement remaining at approximately the same distance from said engaging edge of said ratchet tooth which is in said ratchet tooth engagement position for uniform sensitivity.

2. The safety belt retractor according to claim 1 wherein: said inertia mechanism is a pendulum and said second member, after pre-setting, supports said pendulum in a substantially vertical position when said retractor is tilted for installation in a vehicle.

3. The safety belt retractor according to claim 1 wherein the engagement edge of said ratchet tooth when in its engagement position is aligned with said second member pivot axis.

4. The safety belt retractor according to claim 3 wherein:
said actuating means has a pivot end disposed at the opposite end of said actuating means from said locking end, said pivot end of said actuating means mounted on said second member;
said actuating means having a contact member disposed in the central portion of said actuating means and resting on said inertia mechanism, said actuating means being actuated directly by said inertia mechanism.

* * * * *

UNITED STATES PATENT OFFICE
CERTIFICATE OF CORRECTION

Patent No. 4,046,332               Dated September 6, 1977

Inventor(s) W. M. Wheeler and K. F. Ocker

It is certified that error appears in the above-identified patent and that said Letters Patent are hereby corrected as shown below:

Column 3, line 11, "and/a" should read --and a--.
         line 28, after "movable member" insert the following --22 with reference to the stationary member 20 so that the movable member--.
         line 32, "vetical" should read --vertical--.
         line 35, "aong" should read --along--.

Column 5, line 36, "rathcet" should read --ratchet--.
         line 41, "mounted" should read --mounting--.

Signed and Sealed this

Third Day of January 1978

[SEAL]

Attest:

RUTH C. MASON
Attesting Officer

LUTRELLE F. PARKER
Acting Commissioner of Patents and Trademarks